US008970554B2

(12) United States Patent
Jang et al.

(10) Patent No.: US 8,970,554 B2
(45) Date of Patent: Mar. 3, 2015

(54) ASSEMBLY HAVING DISPLAY PANEL AND OPTICAL SENSING FRAME AND DISPLAY SYSTEM USING THE SAME

(75) Inventors: Hyung-Uk Jang, Anyang-si (KR); Min-Ho Sohn, Anyang-si (KR); Byung-Chun Yu, Paju-si (KR); Jin-Hyuk Jang, Daegu (KR)

(73) Assignee: LG Display Co., Ltd., Seoul (KR)

( * ) Notice: Subject to any disclaimer, the term of this patent is extended or adjusted under 35 U.S.C. 154(b) by 628 days.

(21) Appl. No.: 12/976,666

(22) Filed: Dec. 22, 2010

(65) Prior Publication Data

US 2011/0157050 A1 Jun. 30, 2011

(30) Foreign Application Priority Data

Dec. 24, 2009 (KR) .................. 10-2009-0130931
Dec. 8, 2010 (KR) .................. 10-2010-0125158

(51) Int. Cl.
*G06F 3/042* (2006.01)
(52) U.S. Cl.
CPC .... *G06F 3/0428* (2013.01); *G06F 2203/04104* (2013.01)
USPC .......................................... 345/175; 345/176
(58) Field of Classification Search
CPC ................. G06F 3/0425; G06F 2203/04104; G06F 3/0428; H04N 5/33
USPC .......................................... 345/173, 207, 175
See application file for complete search history.

(56) References Cited

U.S. PATENT DOCUMENTS

| 2005/0248540 | A1* | 11/2005 | Newton .................. 345/173 |
| 2008/0068352 | A1* | 3/2008 | Worthington et al. ........ 345/175 |
| 2008/0143690 | A1* | 6/2008 | Jang et al. .................. 345/175 |
| 2008/0284934 | A1* | 11/2008 | Umezaki et al. ............... 349/43 |
| 2010/0194711 | A1* | 8/2010 | Tsai et al. .................... 345/175 |

FOREIGN PATENT DOCUMENTS

| CN | 101145091 | 3/2008 |
| CN | 201035553 Y | 3/2008 |
| EP | 0221712 A2 | 5/1987 |
| GB | 2176282 A | 12/1986 |
| JP | 2001-282445 | 10/2001 |
| JP | 2002-268811 | 9/2002 |
| JP | 2005-071022 | 3/2005 |
| JP | 38-14106 | 8/2006 |
| JP | 2007-317235 | 12/2007 |
| JP | 2007536617 A | 12/2007 |

OTHER PUBLICATIONS

Office Action issued in corresponding Chinese Patent Application No. 201010610167.1, mailed Jan. 31, 2013.

* cited by examiner

*Primary Examiner* — Long D Pham
(74) *Attorney, Agent, or Firm* — Brinks Gilson & Lione

(57) ABSTRACT

An assembly includes a display panel having four corners, an optical sensing frame having at least three optical modules mounted adjacent a surface of the display panel, where the optical modules are located at the corners of the display panel and optical reflectors extending substantially along an entire length of each of four sides of the display panel, an optical sensing frame controller driving the optical sensing frame, and a display panel controller on a single circuit board with the optical sensing frame controller.

18 Claims, 6 Drawing Sheets

ASSEMBLY HAVING DISPLAY PANEL AND OPTICAL SENSING FRAME AND DISPLAY SYSTEM USING THE SAME

This application claims the benefit of the Korean Patent Application Nos. 10-2009-0130931, filed on Dec. 24, 2009 and 10-2010-0125158, filed on Dec. 8, 2010, which are hereby incorporated by reference as if fully set forth herein.

BACKGROUND

1. Field of the Invention

This disclosure relates to liquid crystal display devices and more particularly to an assembly having the optical sensing frame in which a control unit for driving an optical sensing frame is integrated with a control unit of a display panel.

2. Discussion of the Related Art

In general, a touch panel, providing an interface between an information and communication device, which uses various kinds of displays, is an input unit which enables interface with the device as the user touches a screen with a hand or a pen.

Because such a device can be used by touching a button or icon displayed on a display device with a finger in a conversational and intuitive way, the touch panel is applicable to many fields, such as automatic teller machines in banks and public agencies, various medical apparatus, tour and major facility guidance, and traffic guidance.

In touch panel displays, there are resistive type touch panels, micro capacitive touch glass, ultrasonic wave touch glass, infrared type touch panels, and so on.

The resistive type touch panel has two transparent conductive layers wherein a lower layer thereof is formed of glass or plastic coated with a conductive material, and an upper layer thereof is formed of a film coated with a conductive material. The two layers are spaced by micro printed spacers and electrically insulated. The resistive type touch panel is a device which involves in a change of resistance at each of an upper plate (X-axis) and a lower plate (Y-axis) when the upper plate is touched with a hand or a touch pen when in a state a fixed voltage is being applied to the two layers. In this instance, an X (the upper plate) and a Y (the lower plate) positions of which resistances are changed thus are calculated by a controller to display the positions on a monitor or input as data.

The micro capacitive touch glass has a transparent glass sensor coated with a thin conductive material. Therefore, an electrode pattern is printed along a periphery of a conductive layer precisely and has a transparent vitreous protective film placed closely on the conductive coating for protecting and enclosing the sensor. In the micro capacitive touch glass, a voltage is applied to a screen, and an electrode pattern forms a low voltage field on a touch sensor surface through the conductive layer. When the finger touches the screen, a micro current flows at a touch point. A current from each corner is proportional to a distance from the corner to the finger, and a touch screen controller calculates ratios of current flows for finding a position at which the touch is made.

The ultrasonic wave touch glass displays are not affected by surface damage and do not wear or degrade at all in comparison to other products which are formed of 100% vitreous material, where such vitreous material displays can be destroyed even by small surface damage or wear. In such displays, a touch screen controller forwards a 5 MHz electric signal to a transducer to generate an ultrasonic wave, and the ultrasonic wave generated thus passes along a surface of the touch screen due to reflected rays. In the ultrasonic wave touch glass, if a user presses a surface of the touch screen, a portion of the ultrasonic wave passing through a pressed point is absorbed by the user, a signal lost thus is identified instantly by a controller owing to a received signal and a digital map, and based on this, coordinates of a point having a change of the signal presently are calculated. Such a series of steps are performed independently on X- and Y-axes.

The infrared type touch panel utilizes an attribute of the infrared ray in which the infrared ray cannot travel if the infrared ray is blocked by an obstacle because of the straight travel characteristics of the infrared ray. A portion having a pressure applied thereto cuts off the infrared rays in a transverse direction and a longitudinal direction, and X and Y coordinates of a cut off portion are read for sensing. An infrared ray light type identifies a touched position owing to cut off of an infrared ray scan light at a front of the touch panel. The infrared type touch panel has an infrared ray emitted from one side and received at an opposite side both of x and y axes to form a lattice of the infrared rays.

Though above display types have different advantages, the infrared type touch panel is preferred because of the minimal pressure applied to the touch panel, and because of the convenience of the arrangement.

A related art infrared type touch panel will be described with reference to the attached drawings.

FIG. 1 illustrates a plan view of a related art infrared type touch panel.

Referring to FIG. 1, the related art infrared type touch panel is provided with infrared sensors 5 mounted to adjacent two corners of the panel 10, and reflective plates 7 are mounted to three sides of the panel 10.

A touch to the infrared type touch panel is detected as follows. That is, lights from the infrared sensors 5 are reflected, lights cut off at the time of the touch are sensed, and angels thereof are calculated to perceive the location of the touch.

However, the infrared type touch panel has a dead zone with a range greater than a certain angle between the infrared sensors 5 in which the detection is not possible, making accuracy of the touch poor at a particular region. In order to correct this, the infrared sensors are positioned on far outsides of the corners of the liquid crystal display panel so that the dead zone is formed at an outer side of the liquid crystal panel. In this case, a touch panel having a size greater than the liquid crystal panel is required, resulting in an increased non-effective area, which does not contribute to display picture, thereby reducing the efficiency of the display device.

In general, the liquid crystal panel is separate from the touch panel. If it is intended to produce the touch, a work for assembling respective components and applying coordinates to the touch panel suitable to the liquid crystal panel and a work for securing the touch panel to a liquid crystal module are required.

The related art touch panel has disadvantages in that selection of accurate coordinates is difficult, and only one touch point can be perceived at one time. In other words, if two points on the touch panel are touched at a time, the touch panel fails to perceive this, or perceives one of the touch points touched first, thus causing an error.

The related art touch panel is formed separated from the liquid crystal panel, and requires a touch panel driving unit to have an additional PCB (Printed Circuit Board), and a connection between the touch panel driving unit and the touch panel, and connection between the touch panel driving unit and the liquid crystal panel driving unit. Moreover, since the PCBs of the liquid crystal panel driving unit and the touch panel driving unit are required to be mounted without overlap with one another, and these are required to be connected to a system for controlling the system, at least the touch panel driving unit and the liquid crystal panel are required to have connecting portions between the PCBs, the system and the touch panel driving unit and the liquid crystal panel for driving the touch panel driving unit and the liquid crystal panel respectively, which wiring connections are complex.

Since connection between the PCBs is required, a wiring structure thereof becomes complicated, and integrated circuits are duplicated between the PCBs, thus increasing the cost.

The infrared type touch panels have the following problems.

First, if two infrared cameras are provided, the dead zone takes place at a side adjacent to the two cameras, which requires providing a touch assembly of a size greater than the size of the liquid crystal panel. In this case, a space greater than the liquid crystal panel is required for mounting the touch assembly, making narrow bezel impossible.

Second, when sensing is made only with the two infrared cameras, a ghost image is formed when a multi-touch is made.

Third, since the PCB for driving the touch panel and the PCB for driving the liquid crystal panel are provided individually, the liquid crystal display device has no integrated structure. Therefore, connection among the touch panel, the PCB for driving the touch panel, and the PCB for driving the liquid crystal panel are required, and an assembly process for mounting is required.

Fourth, for example, in order to drive the infrared camera, a connection wiring structure is required for connecting the infrared camera to the PCB for driving the touch panel. Particularly, in view of position, a connection wiring between the infrared camera positioned at an upper side of the liquid crystal panel and the touch panel driving unit positioned on the back side of a lower side of the liquid crystal panel becomes lengthy, which may cause electromagnetic interference.

Fifth, the PCB for driving the touch panel and the PCB for driving the liquid crystal panel are provided individually, having duplicated ICs, which increases the cost.

Sixth, in a case of the touch assembly having two infrared cameras, resulting in a touch assembly larger than the liquid crystal panel, there is no small sized module available.

BRIEF SUMMARY

Accordingly, specific embodiments of the present invention are directed to a display device having the optical sensing frame.

According to some embodiments, a liquid crystal display device has an embedded touch assembly in which a control unit for driving a touch assembly is integrated with a control unit of a liquid crystal panel.

Additional advantages features of the disclosure will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

An assembly includes a display panel, an optical sensing frame, and a display panel controller that drives the display panel. The display panel has four corners and the optical sensing frame has at least three optical modules mounted adjacent a surface of the display panel, where the optical modules are located at the corners of the display panel. The optical sensing frame further includes optical reflectors extending substantially along an entire length of each of four sides thereof. An optical sensing frame controller drives the optical sensing frame. The display panel controller and the optical sensing frame controller are located on a single circuit board.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

DETAILED DESCRIPTION OF THE DRAWINGS AND THE PRESENTLY PREFERRED EMBODIMENTS

Reference will now be made in detail to the specific embodiments of the present invention, examples of which are illustrated in the accompanying drawings. Wherever possible, the same reference numbers will be used throughout the drawings to refer to the same or like parts.

Figure 1:
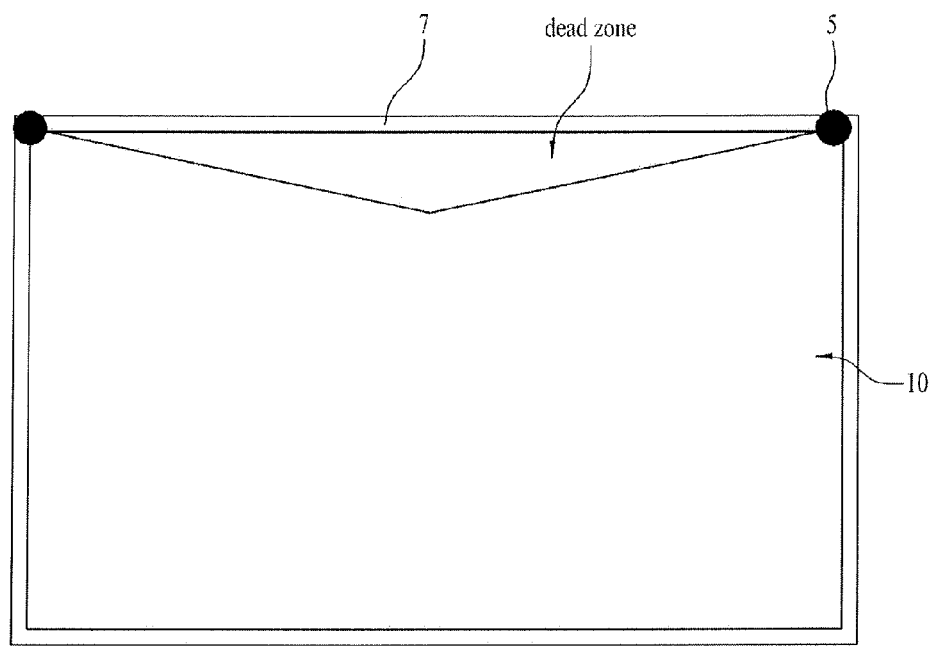
FIG. 1 illustrates a plan view of a related art infrared type touch panel.
Figure 2A:
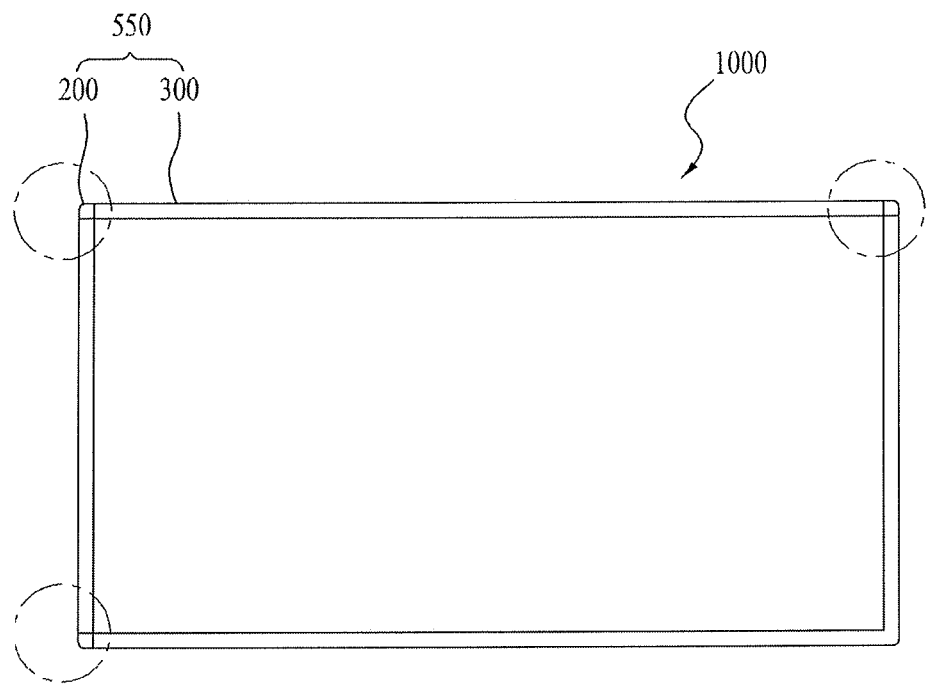
FIGS. 2A and 2B illustrate plan views of a display device (display system) having an optical sensing frame of the present invention, respectively.
Figure 2B:
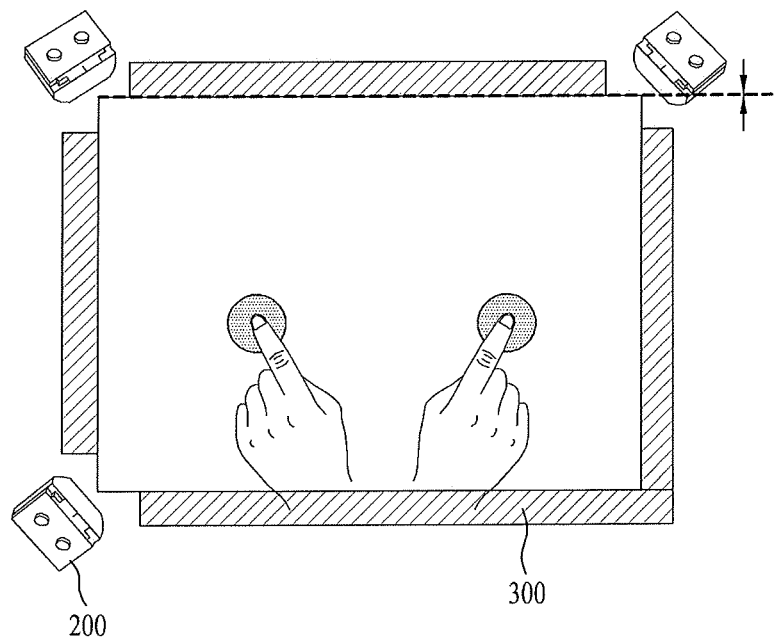

FIGS. 2A and 2B illustrate plan views of a display device (display system) having an optical sensing frame of the present invention, respectively.

Referring to FIGS. 2A and 2B, the display device 1000 having the optical sensing frame includes infrared sensor modules 200 (optical modules) respectively facing at least three corners of a display panel 80, guide structures 170 provided to sides of the display panel 80, and retro-reflecting plates 300, each having a retro-reflecting layer of a plurality of prisms formed on a side of the guide structure 170. The infrared sensor modules 200, the guide structures 170 and the retro-reflecting plates 300 are referred to as the optical sensing frame 550, collectively.

An area of the optical sensing frame is substantially equal to an area f the display panel 80.

As the case may be, the guide structure 170 may be omitted.

Three or more infrared sensor modules 200 are provided for preventing a dead zone, which is area between sensor modules when only two sensor modules are provided. Addition of the third infrared sensor module prevents the dead zone. In this case, the third infrared sensor module 200 in conjunction with one of the two infrared sensor modules 200, measures a touch point, thus enabling touch detection at substantially the entire area of display panel 80.

The infrared sensor modules 200 are mounted adjacent a surface of the display panel 80.

It is preferable that the infrared sensor modules 200 and the retro-reflecting plates 300 are disposed on the same horizontal plane, on an upper surface of edges of the display panel 80. Here, the retro-reflectors are disposed in a vertical-plane on the upper surface of the display panel 80. The retro-reflecting plates 300 are extending substantially along an entire length of each of four sides of the display panel 80.

In this case, the retro-reflecting plates 300 are attached to a wall of the guide structure 170 disposed to face an active area of the display panel 80. The guide structures 170 are removed from portions at which the infrared sensor modules 200 are positioned, and the guide structures are seated in a casing structure, for an example, a case top 180 (See FIG. 8), which encases an upper portion of the optical sensing frame 550 and sides of the display panel 80. The case top 180 is configured to enclose the optical sensing frame and sides of the display panel 80. Here, the retro-reflecting plate is also called a "retro-reflector." If the case top is omitted, the optical sensing frame 550 may be covered by a system cover (not shown). The guide structures 170 are extending substantially along the entire length of each of four sides of the display panel, wherein the retro-reflecting plates 300 are attached to the guide structures 170.

Figure 3:
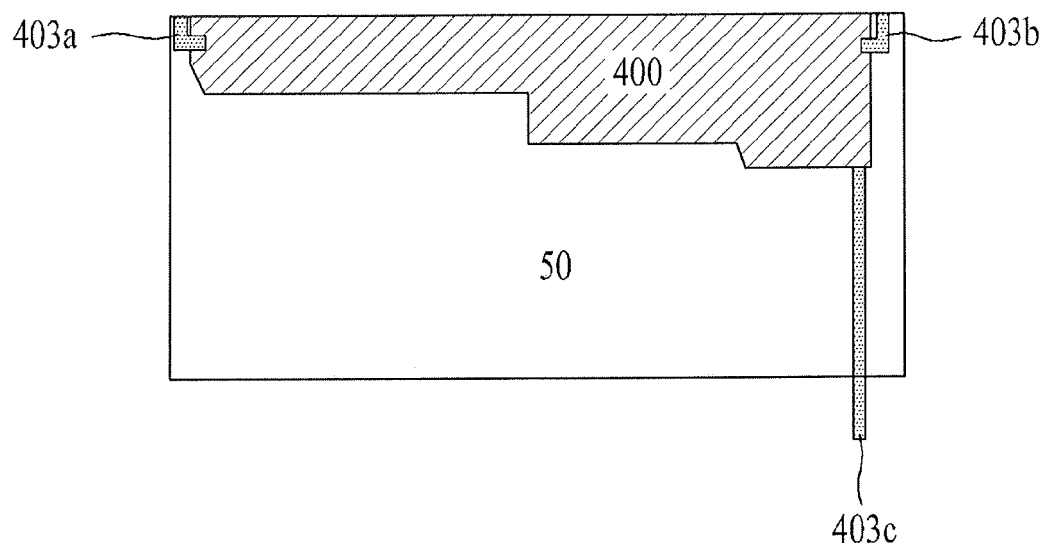
FIG. 3 illustrates a plan view of an outer surface of a cover bottom in the display device of the present invention.
Figure 4:
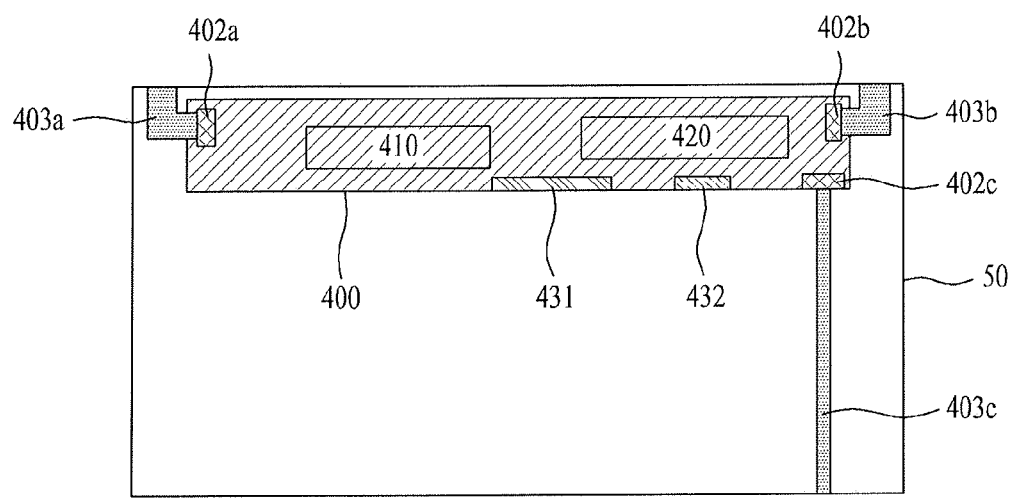
FIG. 4 specifically illustrates a diagram of a PCB (Printed Circuit Board) for driving the display device in FIG. 3.

FIG. 3 illustrates a plan view of an outer surface of a cover bottom in the display device of the present invention. FIG. 4 specifically illustrates a diagram of a PCB (Printed Circuit Board) for driving the display device in FIG. 3.

The case structure includes the case top 180 (See FIG. 8) and a cover bottom 350 to accommodate a backlight unit 190 (see FIG. 8) under the display panel 80. The case top 180 and the cover bottom 350 are fixed each other. FIGS. 3 and 4 shows PCB (Printed circuit board) on an outer surface of the cover bottom 350.

Referring to FIGS. 3 and 4, the display device having the optical sensing frame of the present invention further includes a PCB (Printed Circuit Board) 400 having a display panel control unit 410 for controlling driving of the display panel 80 and a touch control unit 420 for controlling sensing of the infrared sensor module, and flexible printed cable or conductive couplings 403a, 403b and 403c (hereinafter, called to "flexible printed cable") configured to operatively couple the infrared sensor modules 200 and the PCB 400. The PCB 400 as a single circuit board has the touch control unite 420 and the display panel control unit 410.

The infrared sensor module 200 has a front that diagonally faces the corner, and includes a sensing unit 225 (photo sensor) (See FIGS. 7 and 8) for receiving a light retro-reflected from at least two sides, and a light emission unit (LED lens) 220 (See FIGS. 7 and 8) that emits the light in a diagonal direction. In this case, it is preferable that the flexible printed cables 403a, 403b and 403c connected between the infrared sensor modules 200 and the PCB 400 also have a sensing wiring (not shown) connected between the sensing unit 225 of the infrared sensor modules 200 and the touch control unit 420, and a control wiring (not shown) between the light emission unit 220 of the infrared sensor modules 200 and the touch control unit 420.

The sensing unit 225 senses the light reflected at the retro-reflecting plate 300, to sense obstruction of the light reflected by the retro-reflecting plate 300 when a touch body touches the display panel, so as to detect the touch.

In this case, the flexible printed cables 403a, 403b and 403c can be FPCB (Flexible Printed Circuit Board) or FPC (Flexible Printed Circuit).

The flexible printed cables 403a, 403b and 403c are bent to the outer surface of the cover bottom 350 from the infrared sensor modules 200 and connected to the PCB 400. The PCB 400 has connectors 402a, 402b and 402c, respectively connected to the flexible printed cables 403a, 403b and 403c.

The display panel control unit 410 is connected to the display panel 80 and has a function for applying image data from a system (not shown) to the display panel. The touch control unit 420 has a function for processing touch coordinates on the display panel, touch status and event and transmitting data.

The PCB 400 further includes an image data connection unit 431 connected to the system. The PCB 400 further includes a touch coordinate connection unit 432 connected to the system.

In the PCB 400, there are inner metal lines between the touch control unit 420 and touch coordinate connection unit 432/the connectors 402a, 402b and 402c. Further, there is an inner metal line between the image date connection unit 431 and the display panel control unit 410.

Preferably, the PCB 400 is positioned on a side of the outer surface of the cover bottom 350 adjacent two infrared sensor modules 200. The cover bottom 350 and the PCB 400 are disposed under the display panel 80.

One component that has an electrical connection in the optical sensing frame 550 is the infrared sensor module 200, and the retro-reflecting plate 300 has no electric connection, but has a retro-reflecting layer provided thereon for reflecting the light as a passive component.

FIGS. 2A and 2B illustrate front views of the display panel respectively, and FIGS. 3 and 4 illustrate plan views of corresponding to a back side of the display panel respectively. The infrared sensor modules 200 are positioned on a left corner and a right corner of an upper side and a right corner of a lower side with reference to the back side.

Because two adjacent infrared sensor modules are positioned on the upper side, which is a longer side, and which represents the width of the display panel and/or the cover bottom 350, the PCB 400 is arranged on the upper side for minimizing lengths of the flexible printed cables 403a, 403b and 403c. That is, since the PCB 400 has a width which is about the same in width as the long side of the display panel, the flexible printed cables 403a and 403b positioned at the left and right corners of the upper side have lengths substantially similar to, or slightly longer than a side thickness dimension of the display panel, and the flexible printed cable 403c positioned at the right corner of the lower side has a length shorter than a short side of the display panel.

That is, in comparison to a configuration in which a touch controller is provided at a position different from a source PCB that drives the display panel, connecting the infrared sensor modules to the touch control unit at different wiring lengths, wiring lengths can be minimized for at least two infrared sensor modules positions, and because the source PCB and the touch control unit are mounted to the same integrated board or in the same integrated chip, a configuration for connecting the source PCB and the optical sensing frame can also be omitted.

Thus, the display device having the optical sensing frame of the present invention provides the PCB 400 as a single circuit board has the touch control unit 420 and the display panel driving control unit 410, and integrates the control units (controllers) into one PCB 400 or into one integrated chip.

By providing three or more infrared sensor modules 200 at respective corners, a ghost image caused by having only two sensor modules can be eliminated.

The sensing of the dead zone based on only two infrared sensor modules 200 compensated for by using the third infrared sensor module prevents needing to expand the lateral distance between infrared sensor modules. This results in production of a narrow bezel.

Figure 5:
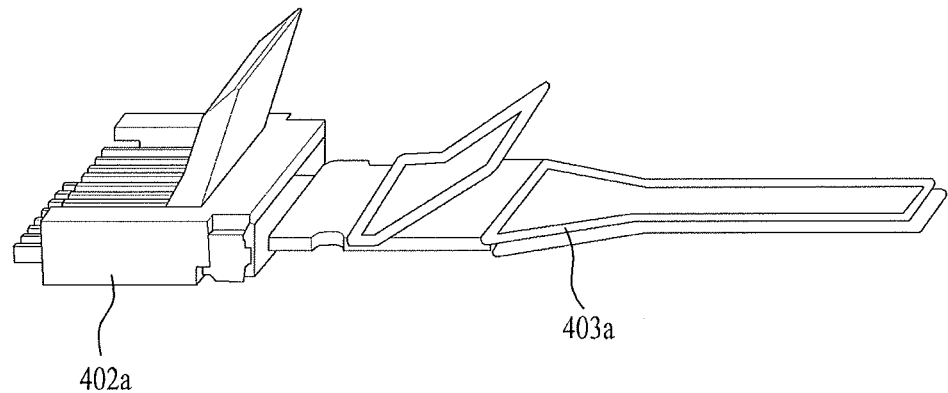
FIG. 5 illustrates a diagram showing connection between a connector and a flexible printed cable connected to the infrared sensor module in FIG. 4.
Figure 6:
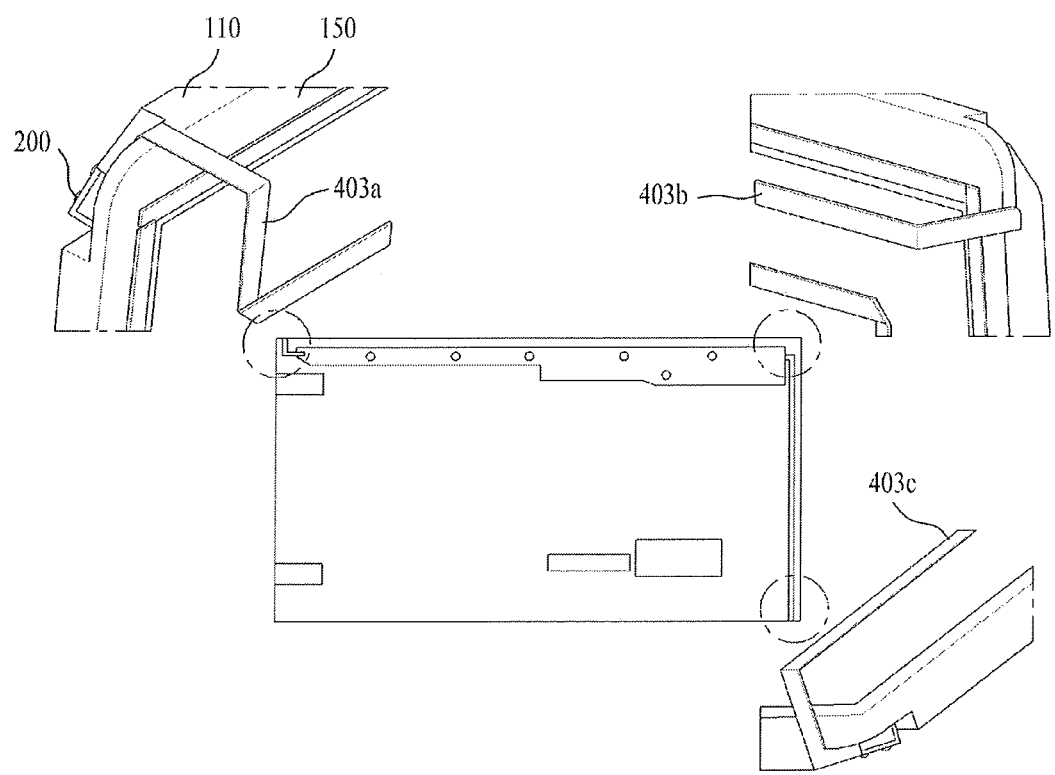
FIG. 6 illustrates a perspective view showing connection between the infrared sensor module and the PCB.

FIG. 5 illustrates a diagram showing connection between a connector and a flexible printed cable connected to the infrared sensor module in FIG. 4. FIG. 6 illustrates a perspective view showing connection between the infrared sensor module and the.

FIG. 5 illustrates the flexible printed cable 403a on a side of the infrared sensor module in FIG. 4, showing the flexible printed cable 403a connected to the connector 402a. FIG. 6 shows the flexible printed cables 403a, 403b placed in an 'L' shape substantially on the outer surface of the cover bottom 350 and connected to the connector 402b provided to the PCB 400.

On some occasion, as shown at the right corner of the upper side in the FIG. 6, the flexible printed cable 403b may be placed in a '–' shape substantially, and connected to the connector of the PCB 400.

Since the flexible printed cable 403c from the infrared sensor module at the right corner of the lower side is spaced from the PCB 400 slightly, the flexible printed cable 403c is lead through a short side of the display panel 80 on a straight line and is connected to the connector of the PCB 400.

Figure 7:
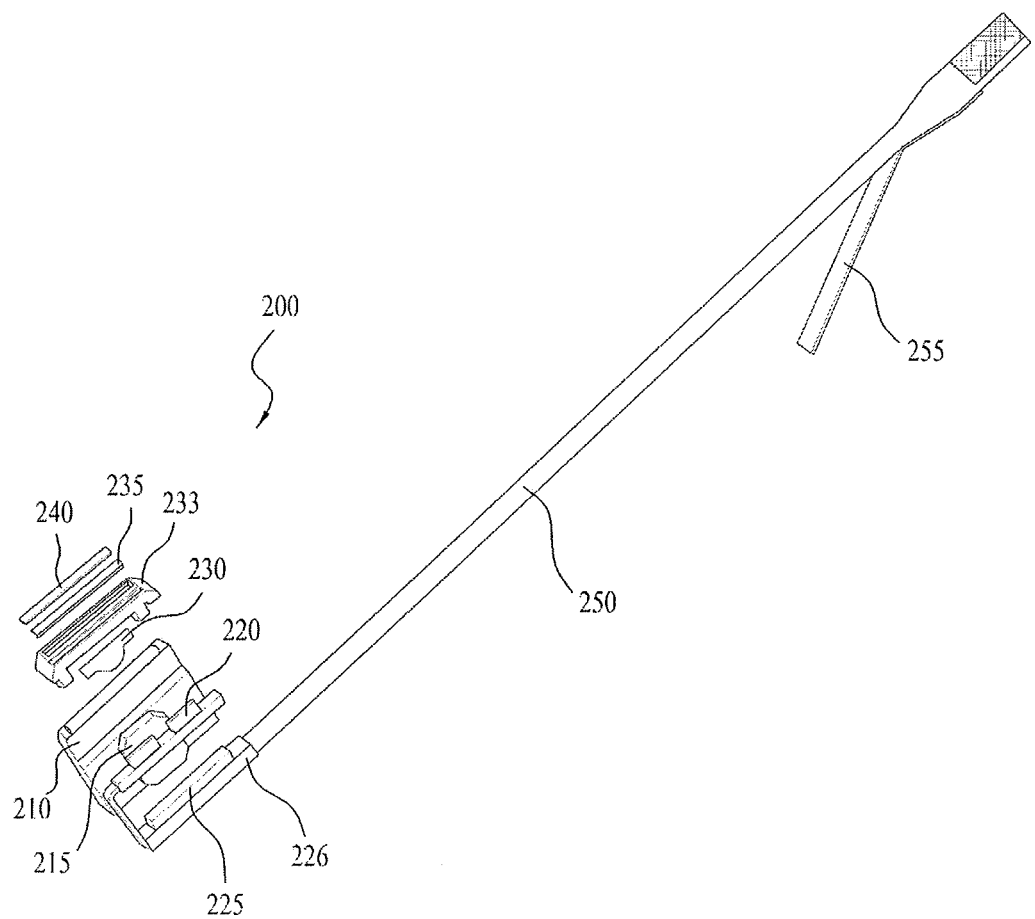
FIG. 7 illustrates a perspective view of an infrared sensor module.

FIG. 7 illustrates a perspective view of an infrared sensor module.

Referring to FIG. 7, the infrared sensor module 200 has at least the sensing unit 225 and the light emission unit 220180. Further, the sensing unit 225 and the light emission unit 220 may have an infrared filter (not shown) and a lens, respectively, to enhance sensing ratio or emission ratio.

Figure 8:
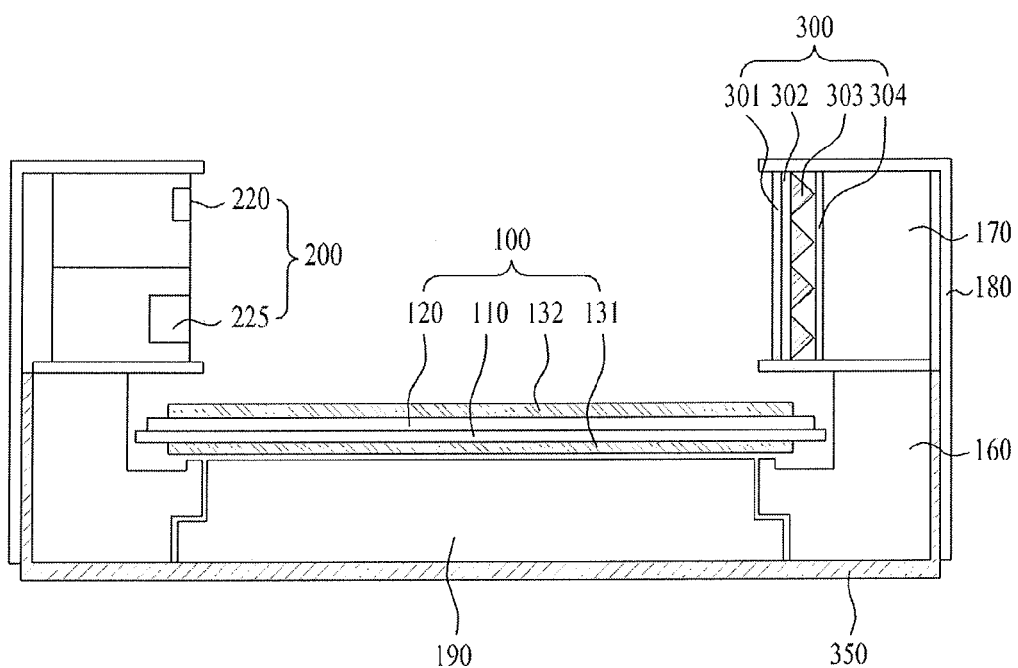
FIG. 8 illustrates a sectional view showing a display device having the optical sensing frame with a preferred embodiment of the present invention.

FIG. 8 illustrates a sectional view showing a display device having the optical sensing frame with a preferred embodiment of the present invention.

FIG. 8 shows that the display panel is a liquid crystal panel 100. The display panel may be the liquid crystal panel, an organic electro luminescence display panel, a plasma display panel, or an electro-phoretic display panel. The embodiment shown in FIG. 8 represents the liquid crystal panel, and the present invention is not limited to use of such a display panel. Any suitable type of display panel may be used.

180 The case top 180 can be rectangular to have opening area in conformity with a shape of the display panel 80, or polygonal as sides are added to the rectangular case top 180 in diagonal directions at the corners thereof. In any case, the case top 180 is formed similar to a picture frame to expose a center portion of the display panel 80.

The sensing unit 225 of the infrared sensor module 200 may be a linear sensor array or an area sensor including a plurality of pixels. In this case, the infrared sensor module 200 is controlled by the touch control unit 420 in the PCB 400 by connecting the flexible printed cable 403a between the infrared sensor module 200 and the connector 402a of the PCB 400. The flexible printed cable 403a is bent at a rear side of the infrared sensor module 200 and passed by an inner side of the case top 180. In this case, the flexible printed cable 403a may be bonded to the inner side of the case top with a two-sided tape (not shown).

It is preferable that the sensing unit 225 has a resolution higher than 500 pixels in a horizontal direction for detecting more than 500 pixels (sensors).

The retro-reflecting plates 300 are disposed on four edges of the liquid crystal panel 80 respectively, and the retro-reflecting plates 300 are attached to sides of the guide structures 170, respectively. In this case, the infrared sensor modules 200 disposed on an upper side of the corners of the display panel 80 and the guide structures 170 including the retro-reflecting plates 300, are positioned on the same plane as the guide structures 170.

The infrared sensor module 200 senses a light reflected at the retro-reflecting plates 300 or obstruction of the light from the infrared sensor module by a touch body (input means, such as a hand or a pen) at a touched point.

As shown in FIG. 8, the liquid crystal panel 100 is provided as the display panel, including a first substrate 110 and a second substrate 120 facing each other, with a liquid crystal layer (not shown) disposed therebetween, and a first polarizing plate 131 and a second polarizing plate 132 formed on back sides of the first substrate 110 and the second substrate 120, respectively.

The liquid crystal panel 100 has the back light unit 190 on a lower side, a support main 160 for supporting the back light unit 190, the liquid crystal panel 100 and the guide structure 170, and the cover bottom 350 for housing the back light unit 190 and the support main 160.

Also provided is a case top 180 configured to surround and cover the guide structure 170, the retro-reflecting plates 300, and the infrared sensor module 200. In this case, the case top 180 is disposed to cover the cover bottom 350 from a side thereof. The case top 180 and the cover bottom 350 may be part of or referred to as a casing structure or housing. In one embodiment, the housing or casing structure may include the support main 160, the guide structure 170, the case top 180, and the cover bottom 350, whether or not such components are separate and independent components.

The guide structure 170 has a lower side projected toward an upper side of the liquid crystal panel 100 for supporting the retro-reflecting plate 300, making fastening between the retro-reflecting plate 300 and the guide structure 170 more rigid.

Thus, all of the elements of the optical sensing frame are covered by the case top 180, making the elements not visible from an outside of the liquid crystal display device, and the disposition of the optical sensing frame in the case top enables the liquid crystal display device to be relatively thin.

Referring to FIG. 8, the retro-reflecting plate 300 includes a retro-reflecting layer 303, a first adhesive layer 304 and a second adhesive layer 302 formed on an underside and a top side of the retro-reflecting layer 303, and an optical filer 301 on the second adhesive layer 303.

The retro-reflecting plate 300 is attached to a side of the guide structure 170 with the first adhesive layer 304 adjacent to the infrared sensor module 200 at the corner.

The retro-reflecting layer 303 is a cube of a cube-corner structure having good efficiency at an incident angle of 0°~65° wide angle and may be a continuously-formed micro prism.

Referring to FIG. 8, the optical filter 301 has a property of transmitting an infrared ray with a wave length of about 700 nm only. The optical filter may be formed of acryl group resin, such as PMMA (Poly Methyl Methacrylate) or Polycarbonate.

To make the optical filter 301 with a property of absorbing a visible light to transmit an infrared ray only, the optical filter 301 may be formed having a black resin.

Alternatively, the optical filter may be formed of glass.

The retro-reflecting plate 300 serves to receive the light emitted from the infrared sensor module 200 and reflects the light again.

In the display device having the optical sensing frame, the infrared sensor modules 200 are arranged at three corners respectively, and in a case of one point touch sensing, light is reflected at the retro-reflecting plate 300 or obstructed at the touch point by a touch body (input means, such as a hand and a pen) by using two sensors. In a case of a multi touch of two or more touch points, the device senses an error point by using two adjacent infrared sensor modules initially, and sensing again using a third infrared sensor module and a infrared sensor module adjacent to the third infrared sensor module for applying a ghost image removing algorithm, which permits proper multi touch sensing.

To drive a plurality of the infrared sensor modules, signal wiring can be provided from the infrared sensor modules to the integrated display panel driving control unit through the FPC, and by positioning the driving control unit between the two sides having the infrared sensor modules so that the lengths of the FPCs can be minimized.

Due to above configuration, the printed circuit boards for driving the display panel and optical sensing frame can be integrated, and the optical sensing frame can be mounted in the case top which encases the display panel, thereby reducing the thickness of the display device.

Moreover, by seating the infrared sensor module having a sensing function for optical signals and the retro-reflecting plate in a casing structure like the case top on the same plane, and connecting to an integrated board in a rear side of the infrared sensor modules with the FPC, an assembling process can be improved.

Because one driving printed circuit board and/or on integrated chip drives both the display panel and the optical sensing frame simultaneously, the number of individual integrated circuit ICs can be reduced, thus reducing the cost.

If the display panel 80 is a light receiving device, a back light unit can be provided.

For example, if the display panel 80 is the liquid crystal panel, the liquid crystal panel has the first and second substrates, and a liquid crystal layer filled therebetween, wherein a plurality of gate lines and data lines crossed each other to define pixel regions, and a thin film transistor array (not shown) having a thin film transistor at every pixel region are formed on the first substrate. A black matrix layer, and a color filter array having color filter layers are formed on the second substrate.

In this case, the printed circuit board 400 is disposed at one side of the display panel 80, and a COF (Chip On Film) connected to a pad electrode opposite to ends of the gate lines and data lines is connected to one side of the printed circuit board 400.

In this instance, the COF includes a drive IC for forwarding a signal of gate lines or data lines to one of groups of the plurality of data lines or the gate lines. Depending on cases, the signal of the gate lines can be forwarded to an LOG (Line On Glass) formed at an edge of the first substrate as a gate driving signal. In this case, a connection wiring connected to a gate driving signal output terminal is provided to one of the COF additionally for connection to the LOG wiring pad electrode.

The printed circuit board 400 further includes a controller (not shown) connected to the other side of the COF for receiving image data from a host system (not shown) and processing the image data suitable to the panel, and making various control signals, and a power supply unit for fixing and generating voltage levels of various signals.

If the gate driving unit is provided in a mode of the LOG wiring, dispensing with a separate gate PCB, even if only one source PCB fabricated for the pad electrodes of the data lines is provided, the printed circuit board 400 can be provided.

In the display device having the optical sensing frame, the display panel control unit 410 (for an example, a timing controller) and the touch control unit 420 (touch controller) is provided together on one board (PCB 400) or circuit. In this case, the power source voltage unit is provided to the board together with the touch control unit 420 and the display panel control unit 410 is connected with the same power source voltages. And, the one board (PCB 400) is disposed on the outer surface of the cover bottom 350 and fixed to the outer surface of the cover bottom 350.

With respect to the related art resistive type touch panel, a size of the touch panel greater than the display panel is defined for offset taking the dead zone into account due to use of two infrared sensor modules, since the display device having the optical sensing frame of an embodiment of the present invention has three or more camera sensors provided thereto, thus preventing the dead zone. The ghost image can be removed permitting a size of the optical sensing frame to almost fit to edges of the display panel. Because the touch control unit 420 is integrated to the printed circuit board, corresponding lengths of connection wiring is reduced.

By positioning a connection portion of the infrared sensor modules to left/right opposite ends of the integrated board, wiring lengths of the camera modules can be minimized.

By positioning a touch coordinate signal connection portion at the integrated board, a wiring structure can be simplified.

Electrical signals for controlling the sensing unit and the light emission unit can be integrated into a wiring of one FPCB (Flexible Printed Circuit Board).

As has been described, the display device with an embedded optical sensing frame of an embodiment of the present invention has the following advantages.

First, the provision of the control unit for driving the liquid crystal panel with the touch control unit on the same board enables us of an integrated the control unit or controller.

Second, the provision of three infrared sensor modules at three corners permits removal of the ghost image.

Third, the prevention dead zone due to sensing by the third infrared sensor module permits arrangement of the infrared sensor modules and the retro-reflecting plates without requiring a space to a periphery of the display panel at the lateral ends thereof, thus enabling production of a narrow bezel.

Fourth, for driving the plurality of infrared sensor modules, signal wirings from the infrared sensor modules can be connected to the integrated display panel driving control unit through the FPC, and by positioning the driving control unit corresponding between the two sides having the infrared sensor modules, lengths of the FPCs can be minimized.

Fifth, by mounting the optical sensing frame in the case top which encases the display panel, total thickness of the display device can be reduced.

Sixth, by seating the infrared sensor modules which sense a touch and the retro-reflecting plates on the same plane in a case structure and connecting the FPC to the integrated board in a rear side of the infrared sensor modules, assembly process is improved.

Seventh, since one driving printed circuit board or integrated chip performs driving of the display panel and the driving of touch detection, individual integrated circuits required when the driving is performed by two printed circuit boards or chips can be omitted, thus reducing costs.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

The invention claimed is:

1. An assembly having a display panel and optical sensing frame, the assembly comprising:
   the display panel having four corners, and a display panel controller that drives the display panel;
   the optical sensing frame having at least three optical modules mounted adjacent a surface of the display panel and retro-reflectors extending substantially along an entire length of each of four sides of the display panel, wherein the optical modules are located at different corners of the display panel;
   an optical sensing frame controller that drives the optical sensing frame;
   a case top configured to enclose an upper portion of the optical sensing frame and sides of the display panel,
   a cover bottom configured to enclose a lower portion of the display panel;
   a single board on which the display panel controller and the optical sensing frame controller are disposed; and
   flexible conductive couplings disposed along an inner surface of the case top and the outer surface of the cover bottom, to connect the optical modules at the different corners of the display panel to the single board.

2. The assembly of claim 1, wherein the display panel controller and the touch panel controller are integrated in a single chip.

3. The assembly of claim 1, wherein each optical module includes an optical emitter and an optical sensor.

4. The assembly of claim 1, wherein use of the at least three optical modules eliminates a dead zone and ghost images.

5. The assembly of claim 1, wherein the optical sensing frame further comprises guide structures extending substantially along the entire length of each of four sides of the display panel, wherein the retro-reflectors are attached to the guide structures.

6. The assembly of claim 5, wherein a first optical module is mounted on an upper left corner of the guide structure, a second optical module is mounted on an upper right corner of the guide structure, and a third optical module is mounted on a lower corner of the optical sensing frame, wherein the first and second optical modules are disposed proximate the single circuit board.

7. The assembly of claim 1, further comprising a flexible conductive coupling disposed along an inner surface of the case top and the outer surface of the cover bottom, the flexible conductive coupling routing signals from the optical modules to the optical sensing frame controller on the single circuit board.

8. The assembly of claim 7, wherein the flexible conductive coupling is one of a printed cable, a flexible printed circuit board, and a flexible printed circuit.

9. The assembly of claim 7, wherein the flexible conductive coupling includes coupling members connecting to the single circuit board at distal lateral edges of the single circuit board so as to minimize a length of the coupling members, respectively.

10. The assembly of claim 1, wherein an area of the optical sensing frame is substantially equal to an area of the display panel so as to permit a narrow bezel.

11. The assembly of claim 1, wherein the retro-reflectors are disposed in a vertical-plane to a surface of the display panel.

12. The assembly of claim 1, wherein the display panel is one of an LCD display panel, an organic electro luminescence display panel, an electrophoresis display panel, and a plasma display panel.

13. A display system having a display panel and optical sensing frame, the system comprising:
   a display panel having four corners;
   the optical sensing frame having at least three infrared modules mounted adjacent a surface of the display panel and retro-reflectors extending substantially along an entire length of each of four sides of the display panel, the infrared modules located at different corners of the display panel and configured to emit infrared light and detect infrared light, wherein use of the at least three infrared modules eliminates a dead zone, and eliminates ghost images when a multi-touch operation is performed on the display panel;
   a single controller mounted on a circuit board and configured to drive both the display panel and the optical sensing frame;
   a case top configured to enclose an upper portion of the optical sensing frame and sides of the display panel,
   a cover bottom configured to enclose a lower portion of the display panel; and
   flexible conductive couplings disposed along an inner surface of the case top and the outer surface of the cover bottom, to connect the at least three infrared modules at the different corners of the display panel to the circuit board.

14. The system of claim 13, wherein the optical sensing frame further comprises guide structures extending substantially along the entire length of each of four sides of the display panel, wherein the retro-reflectors are attached to the guide structures.

15. The system of claim 13, further comprising a flexible conductive coupling disposed within the case top, the flexible conductive coupling routing signals from the optical modules to the single controller.

16. The system of claim 13, wherein an area of the optical sensing frame is substantially equal to an area of the display panel so as to permit a narrow bezel.

17. The system of claim 13, wherein the retro-reflectors are disposed in a vertical-plane to a surface of the display panel.

18. An assembly having a display panel and optical sensing frame, the assembly comprising:
   a display panel having four corners, and a display panel controller that drives the display panel;
   the optical sensing frame having at least three optical modules mounted adjacent a surface of the display panel and retro-reflectors extending substantially along an entire length of each of four sides of the display panel, the optical modules located at different corners of the display panel;
   an optical sensing frame controller that drives the optical sensing frame;
   a case top configured to enclose an upper portion of the optical sensing frame and sides of the display panel,
   a cover bottom configured to enclose a lower portion of the display panel; and
   flexible conductive couplings disposed from the optical modules at the different corners of the display panel and along an inner surface of the case top and the outer surface of the cover bottom, wherein the display panel controller and the optical sensing frame controller are disposed on a single circuit board.

\* \* \* \* \*